United States Patent [19]

Mueller et al.

[11] Patent Number: 4,788,105
[45] Date of Patent: Nov. 29, 1988

[54] OXYGEN BARRIER LAMINATES

[75] Inventors: Walter B. Mueller, Inman; Henry G. Schirmer, Spartanburg, both of S.C.

[73] Assignee: W. R. Grace & Co., Duncan, S.C.

[21] Appl. No.: 905,364

[22] Filed: Sep. 9, 1986

[51] Int. Cl.[4] .............................................. B32B 27/08
[52] U.S. Cl. .................. 428/412; 428/475.8; 428/476.1; 428/483; 428/516; 428/518; 428/520; 428/349
[58] Field of Search ................. 428/35, 349, 516, 520, 428/518, 412, 483, 475.5, 476.1

[56] References Cited

U.S. PATENT DOCUMENTS

| | | | |
|---|---|---|---|
| 4,182,457 | 1/1980 | Yamada et al. | 428/35 |
| 4,188,443 | 1/1980 | Yamada | 428/216 |
| 4,284,674 | 8/1981 | Sheptak | 428/69 |
| 4,355,721 | 10/1982 | Knott et al. | 428/516 |
| 4,421,823 | 12/1983 | Theisen et al. | 428/349 |
| 4,457,960 | 7/1984 | Newsome | 428/35 |
| 4,495,249 | 1/1985 | Ohya et al. | 428/516 |
| 4,561,920 | 12/1985 | Foster | 428/518 |
| 4,576,988 | 3/1986 | Tanaka et al. | 524/503 |
| 4,578,294 | 3/1986 | Ouchi et al. | 428/35 |
| 4,588,648 | 5/1986 | Krueger et al. | 428/475.8 |
| 4,608,311 | 8/1986 | Giles et al. | 428/520 |
| 4,615,926 | 10/1986 | Hsu et al. | 428/35 |
| 4,640,856 | 2/1987 | Ferguson et al. | 428/36 |
| 4,684,573 | 8/1987 | Mueller et al. | 428/518 X |
| 4,687,968 | 8/1987 | Frayer | 313/509 |
| 4,690,865 | 9/1987 | Fong | 428/518 X |
| 4,701,360 | 10/1987 | Gibbons et al. | 428/35 |

FOREIGN PATENT DOCUMENTS

| | | | |
|---|---|---|---|
| 212062 A | 12/1983 | United Kingdom . | |
| 2142277 | 1/1985 | United Kingdom | 428/483 |

OTHER PUBLICATIONS

Proceedings of the Fifth Annual International Coextrusion Conference and Exhibition, Oct. 9-11, 1983.

*Primary Examiner*—Edith Buffalow
*Attorney, Agent, or Firm*—John J. Toney; William D. Lee, Jr.; Mark B. Quatt

[57] ABSTRACT

A thermoplastic laminate comprises an oxygen barrier film, and a second film adhered to the oxygen barrier film and comprising a polymeric material which adds heat resistance and stiffness to the laminate. Such materials are preferably polycarbonate, polyamide, polypropylene, and polyester.

3 Claims, 1 Drawing Sheet

OXYGEN BARRIER LAMINATES

The present invention relates to thermoplastic packaging film, and more particularly to packaging films useful in lid stock applications.

BACKGROUND OF THE INVENTION

Thermoplastic materials have been used for some time in packaging food articles. The central processing of food items, and the packaging of food items to permit relatively easy preparation by for example the use of microwave ovens, is increasingly common. With the increasing popularity of such methods of food preparation, the demands on packaging materials for such food items have also increased.

Such materials must possess good toughness combines with resistance to elevated temperatures during a heating cycle. Additionally, such materials should exhibit high oxygen barrier characteristics to protect the typically oxygen sensitive food item.

Of interest is U.S. Pat. No. 4,188,443 issued to Mueller which discusses a multilayer film of three or five layers in which one or both of the outside layers comprises a polyester.

Of interest is U.S. Pat. No. 4,576,988 issued to Tanaka et al disclosing a melt molding material having a silicon-containing ethylene vinyl alcohol copolymer coated with vinylidene chloride.

Of interest is UK Patent Application No. GB2121062A (Mollison) which discusses a pouch for flowable materials made from a film comprising a laminate of a base film and a sealant film. The base film may be polyethylene terephthalate film, or saponified ethylene vinyl acetate film. A layer of polyvinylidene chloride may be interposed between the base film and sealant film.

Of interest is Proceedings of the Fifth Annual International Coextrusion Conference and Exhibition, Oct. 9-11, 1985 discussing the blending of ethylene vinyl alcohol copolymer with for example polyethylene terephthalate.

It is an object of the present invention to provide a packaging material with heat resistant properties.

It is an additional object of the present invention to provide such a packaging film with good dimensional stability.

It is still another object of the present invention to provide a packaging material suitable for use in microwavable package systems.

It is yet another object of the present invention to provide a packaging material useful in microwavable applications, and with high oxygen barrier properties.

SUMMARY OF THE INVENTION

In accordance with the present invention, a thermoplastic laminate comprises an oxygen barrier film, and a second film adhered to the oxygen barrier film and comprising a polymeric material which adds stiffness and heat resistance to the laminate.

In another aspect of the present invention, a method of producing a thermoplastic laminate comprises coextruding an oxygen barrier film, and adhering the coextruded film to a second film comprising a polymeric material which adds stiffness and heat resistance to the laminate.

DEFINITIONS

The term "oxygen barrier" and the like is used herein to refer to a property of certain polymeric materials which permits only limited oxygen transmission through a film including such material. Films exhibiting oxygen transmission of less than 100 cc per square meter in 24 hours at 73° C., preferably less than 10 cc per square meter in 24 hours at 73° C. (ASTM D3985) are typically considered as oxygen barrier films. The term "oxygen impermeable" is used interchangeably with "oxygen barrier".

The term "polyester" is used herein to mean thermoplastic, film-forming, saturated polyester such as polyethylene terephthalate or polybutylene terephthalate.

The term "polyamide" is used herein to mean a high molecular weight polymer with amide linkages along the molecular chain, and especially synthetic polyamides such as the numerous nylons.

The term "polypropylene" is used herein to mean a synthetic crystalline thermoplastic polymer made by the polymerization of propylene monomer.

The term "polycarbonate" is used herein to refer to groups of dihydric or polyhydric phenols linked to carbonate groups to form a polymeric material. More generally, polycarbonates may be formed from any dihydroxy compound and any carbonate diester, or by ester interchange.

The term "stiffness" is used herein to indicate a laminate having a secant modulus greater than about 100,000 pounds per square inch.

The term "heat resistance" is used herein to describe a polymeric material having a melting point approximately 50° F. higher than the heat sealant layer of the laminate. A preferred range of heat resistance runs from about 250° F. to about 550° F. melting point.

DESCRIPTION OF THE PREFERRED EMBODIMENT

Figure 1:
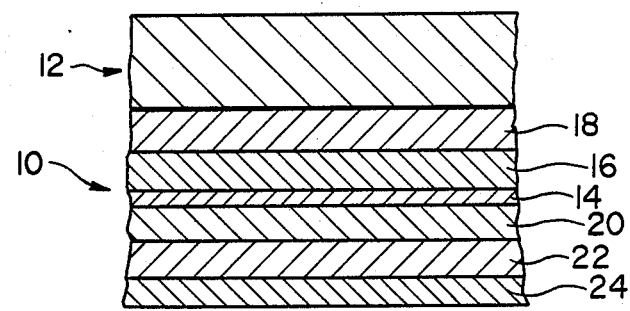
FIG. 1 is a schematic cross-sectional view of a preferred embodiment of the present invention.

Referring to the sole figure drawing, FIG. 1, which is a schematic cross-sectional view of a preferred embodiment of the present invention, it is seen that this embodiment comprises a multilayer base film 10 laminated to an outer film 12.

Base film 10 includes a layer 14 of an oxygen barrier material such as ethylene vinyl alcohol copolymer (EVOH) or a copolymer of vinylidene chloride. Commercially available examples of EVOH include EVAL resins available from EVAL Co. of America. Suitable vinylidene chloride copolymers include vinylidene chloride comonomer copolymerized with comonomers such as vinyl chloride, acrylonitrile, and various acrylates. These materials are commonly known as saran, and are available from Solvay and Dow Chemical Co.

In an alternate embodiment, ethylene vinyl alcohol copolymer and a vinylidene chloride copolymer may be included as separate oxygen barrier layers within base film 10, resulting in a high oxygen barrier base film suitable for both low humidity and high humidity applications.

Barrier layer 14 is adhered by polymeric layer 16 to a bonding layer 18 comprising an ethylene vinyl acetate copolymer, (EVA) such as PE204-CS95 EVA copolymer available from El Paso. This particular resin has a vinyl acetate content of about 3.6%. Adhesive layer 16 may be an ethylene vinyl acetate or a chemically modified ethylene vinyl acetate such as Plexar 158, a low density polyethylene-based adhesive available from Norchem.

Layer 18 provides a bonding surface to bond the base film 10 to outer film 12.

Barrier layer 14 is adhered by a polymeric adhesive layer 20 to layer 22 comprising a linear low density polyethylene (LLDPE). The material of adhesive layer 20 may be similar to that of adhesive layer 16. The LLDPE of layer 22 may be for example Dowlex 2045 available from Dow Chemical.

An outer layer 24 comprises an ethylene vinyl acetate copolymer which may be similar to that of outer layer 18.

Film 12 preferably comprises a polyester, more preferably an oriented and heat set polyester. This polyester is characterized by resistance to elevated temperatures, dimensional stability, toughness and stiffness. A suitable commercial resin is Hostapahan 2400 available from American Hoechst. The polyester may optionally be metallized.

Film 12 can also be an oriented and heat set polypropylene including coated or metallized polypropylene.

Film 12 can also comprise an oriented and heat set polyamide such as any of the various nylons, and may also be a polycarbonate.

Typically, multilayer base film 10 will be about 1 mil thick, with outer film 12 about half the thickness of the multilayer base film.

It may be desirable to irradiate the multilayer film 10 by means well known in the art. Film 10 can be irradiated at dosages of between 1 and 12 megarads to produce a cross-linked polymeric film. Other methods of cross-linking include chemical cross-linking.

Multilayer film 10 is adhered to film 12 preferably by corona bonding. Other means of adhesion may also be employed. When utilizing corona bonding, the end use applications of the film will be dictated to some extent by the moisture sensitivity of the corona bonded surfaces.

In an alternate embodiment, multilayer film 10 may include at least two distinct barrier layers, one containing an ethylene vinyl alcohol copolymer, and the other including a vinylidene chloride copolymer. This particular embodiment provides a very high oxygen barrier film with reduced sensitivity to high and low humidity conditions. Such a structure may include the respective barrier layers with an intermediate layer of an adhesive polymeric material disposed between the vinylidene chloride copolymer layer and the ethylene vinyl alcohol copolymer layer. Additional layers of polymeric adhesives may bond the respective barrier layers to outer layers comprising polyolefins and copolymers of ethylene.

In additional alternate embodiments, outer layer 18, which may function as a heat seal layer, may include polymeric materials other than the ethylene vinyl acetate copolymer. Examples of these alternate materials are ethylene methyl acrylate, copolyester, ionomers, linear low density polyethylene, very low density polyethylene, and ethylene copolymerized with acrylic and methacrylic acids. The melting point of these various resins ranges from approximately 200° F. to about 430° F. The heat resistance of the polymeric material of the second film adhered to the substrate will therefore preferably be about 50° F. greater than the melting point of the particular sealant layer employed.

Reference is made to the examples 1 through 3 below which demonstrate specific embodiments of the present invention.

EXAMPLE 1

A base film was made by the coextrusion of a first layer of EVA having 4.5% vinyl acetate comonomer, (Exxon 32.89) a second layer of linear low density polyethylene (Dowlex 2045), a third layer of an ethylene vinyl acetate copolymer (Elvax 3170) having 17% vinyl acetate, a fourth barrier layer of unplasticized saran (PV864), a fifth layer of ethylene vinyl acetate copolymer (Elvax 3170), and a sixth layer of EVA (Exxon 32.89). The coextruded film was cooled and advanced to a take up roll with a finished film thickness of about 1 mil.

A 0.48 mil thick polyester film comprising Hostaphan 2400 was treated by corona bonding and laminated to the coextruded film.

EXAMPLE 2

A film similar to that in Example 1 makes use of Plexar 158 as a polymeric adhesive, and with the use of EVAL as the barrier material.

EXAMPLE 3

A film similar to that of Example 2 is provided, with the multilayer film irradiated prior to lamination to the polyester film.

EXAMPLE 4

A film similar to that of Example 2 is provided, with a base film having a finished film thickness of about 1 mil, and optionally irradiated up to about 12 megarads, and laminated to a polycarbonate film having a thickness between 0.5 and 1 mils and treated by corona bonding for lamination to the coextruded base film.

It should be understood that the detailed description and specific examples which indicate the presently preferred embodiments of this invention are given by way of illustration only since various changes and modifications within the spirit and scope of the appended claims will become apparent to those of ordinary skill in the art upon review of the above detailed description and examples.

What is claimed is:

1. A thermoplastic laminate comprising:
   (a) a first film comprising a first layer of an ethylene vinyl acetate copolymer, a second layer of a linear low density polyethylene, a third layer of a polymeric adhesive, a fourth layer of a polymeric material having an oxygen transmission rate of less than 100 cubic centimeters per square meter in 24 hours at 73 degrees centigrade, a fifth layer as in said third layer, and a sixth bonding layer of an ethylene vinyl acetate copolymer; and
   (b) a second film adhered to the first film comprising a polymeric material selected from the group consisting of polyester, polyamide, polypropylene, and polycarbonate.

2. The laminate according to claim 1 wherein the polymeric material of the fourth layer is an oxygen barrier material selected from the group consisting of vinylidene chloride copolymer and ethylene vinyl alcohol copolymer.

3. The laminate according to claim 1 wherein the polymeric adhesive comprises an ethylene vinyl acetate copolymer or a chemically modified ethylene vinyl acetate copolymer.

* * * * *